(12) United States Patent
Marinelli et al.

(10) Patent No.: US 10,432,457 B2
(45) Date of Patent: Oct. 1, 2019

(54) METHOD AND SYSTEM FOR PERFORMING A READ-MODIFY-WRITE OPERATION ON A NETWORK ELEMENT

(71) Applicant: Arista Networks, Inc., Santa Clara, CA (US)

(72) Inventors: Robert Marinelli, Palo Alto, CA (US); Aaron Levitan, San Francisco, CA (US); Neal Thomas Nuckolls, Seattle, WA (US); Grzegorz Poloczek, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 558 days.

(21) Appl. No.: 15/160,668

(22) Filed: May 20, 2016

(65) Prior Publication Data
US 2017/0339015 A1 Nov. 23, 2017

(51) Int. Cl.
*G06F 15/177* (2006.01)
*H04L 12/24* (2006.01)
*G06F 3/06* (2006.01)

(52) U.S. Cl.
CPC .......... *H04L 41/0813* (2013.01); *G06F 3/067* (2013.01); *G06F 3/0619* (2013.01); *G06F 3/0661* (2013.01); *H04L 41/046* (2013.01)

(58) Field of Classification Search
CPC ................................................ H04L 41/0813
USPC ....................................................... 709/220
See application file for complete search history.

(56) References Cited

U.S. PATENT DOCUMENTS

| | | | | |
|---|---|---|---|---|
| 5,805,805 A | * | 9/1998 | Civanlar | H04L 12/4608 370/409 |
| 6,212,559 B1 | * | 4/2001 | Bixler | H04L 41/082 709/220 |
| 6,587,874 B1 | * | 7/2003 | Golla | H04L 41/08 707/999.1 |
| 6,721,880 B1 | * | 4/2004 | Pike | H04L 29/06 709/220 |
| 6,757,779 B1 | * | 6/2004 | Nataraj | G11C 8/04 711/108 |
| 7,974,942 B2 | * | 7/2011 | Pomroy | G06F 21/6245 707/610 |
| 8,880,664 B1 | * | 11/2014 | Tekle | H04L 41/0803 709/223 |
| 9,570,125 B1 | * | 2/2017 | Gajapathy | G11C 7/1078 |
| 2006/0159100 A1 | * | 7/2006 | Droms | H04L 12/2801 370/395.2 |

(Continued)

FOREIGN PATENT DOCUMENTS

EP 2947640 A1 * 11/2015 ............... G09C 1/00

*Primary Examiner* — Atta Khan
(74) *Attorney, Agent, or Firm* — Chamberlain, Hrdlicka, White, Williams & Aughtry

(57) ABSTRACT

In general, embodiments of the invention relate to a method for modifying a targeted subset of a table row (consisting of assorted data) on a network element. More specifically, a network element agent, executing on the network element, may request that changes be applied to a portion of the assorted data, hence the targeted subset, without affecting the remainder of the table row (which may include data relevant to the responsibilities of other network element agents). Through the application of masking, changes applied only to the targeted subset may be achieved.

13 Claims, 6 Drawing Sheets

(56) References Cited

U.S. PATENT DOCUMENTS

| | | | |
|---|---|---|---|
| 2007/0156861 A1* | 7/2007 | Nedelcu | H04L 41/12 709/220 |
| 2008/0025299 A1* | 1/2008 | Agarwal | H04L 29/1282 370/389 |
| 2008/0028437 A1* | 1/2008 | Zeng | H04L 63/08 726/2 |
| 2009/0090957 A1* | 4/2009 | Onda | H01L 27/112 257/316 |
| 2011/0035718 A1* | 2/2011 | McBeth | G06F 17/505 716/136 |
| 2013/0111499 A1* | 5/2013 | Dixon | G06F 13/00 719/314 |
| 2013/0219134 A1* | 8/2013 | Macri | G06F 13/4234 711/154 |
| 2016/0170640 A1* | 6/2016 | Jalan | G06F 9/30141 711/155 |
| 2016/0212223 A1* | 7/2016 | Yang | H04L 61/2015 |

* cited by examiner

METHOD AND SYSTEM FOR PERFORMING A READ-MODIFY-WRITE OPERATION ON A NETWORK ELEMENT

BACKGROUND

Configuration settings, pertinent to the operation of a network element, are often stored in registers and/or memory tables, within a network processor, which can be manipulated by one or more processes. Further, in said registers and/or memory tables, changes are only permitted to be performed a table row at a time. Non-overlapping data subsets, relevant to different processes, may represent the data within a table row. A challenge, more so, arises when a subset of data is to be changed without affecting the remainder subset(s) of data in the table row.

SUMMARY

In general, in one aspect, embodiments of the invention relate to a method for managing a network element. The method includes receiving, from a first network element agent, a write request comprising a row memory address, a row write mask, and a row write data, obtaining, from a network processor, a row associated with the row memory address, wherein the row comprises the data, applying, over the row, the row write mask to obtain a masked row, modifying, using the row write data, a first targeted subset of the data to obtain a new masked row, removing, from the new masked row, the row write mask to obtain a new row, and writing, to the network processor, the new row.

In general, in one aspect, embodiments of the invention relate to a network element. The network element includes a control plane comprising a network element agent, a hardware interposer operatively connected to the network element agent, and a network processor operatively connected to the hardware interposer, wherein the hardware interposer is configured to receive, from the network element agent, a write request comprising a row memory address, a row write mask, and a row write data, obtain, from the network processor, a row associated with the row memory address, wherein the row comprises data, apply, over the row, the row write mask to obtain a masked row, modify, using the row write data, a targeted subset of the data to obtain a new masked row, remove, from the new masked row, the row write mask to obtain a new row, and write, to the network processor, the new row.

In general, in one aspect, embodiments of the invention relate to a network element. The network element includes a control plane comprising a network element agent and a software interposer, wherein the network element agent and the software interposer are operatively connected, and a network processor operatively connected to the software interposer, wherein the software interposer is configured to receive, from the network element agent, a write request comprising a row memory address, a row write mask, and a row write data, obtain, from the network processor, a row associated with the row memory address, wherein the row comprises data, apply, over the row, the row write mask to obtain a masked row, modify, using the row write data, a targeted subset of the data to obtain a new masked row, remove, from the new masked row, the row write mask to obtain a new row, and write, to the network processor, the new row.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4C, any component described with regard to a figure, in various embodiments of the invention, may be equivalent to one or more like-named components described with regard to any other figure. For brevity, descriptions of these components will not be repeated with regard to each figure. Thus each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method for modifying a targeted subset of a table row (consisting of assorted data) on a network element. More specifically, in one or more embodiments of the invention, a network element agent, executing on the network element, may request that changes be applied to a portion of the assorted data, hence the targeted subset, without affecting the remainder of the table row (which may include data relevant to the responsibilities of other network element agents). Through the application of masking, changes applied only to the targeted subset may be achieved.

Figure 1A:
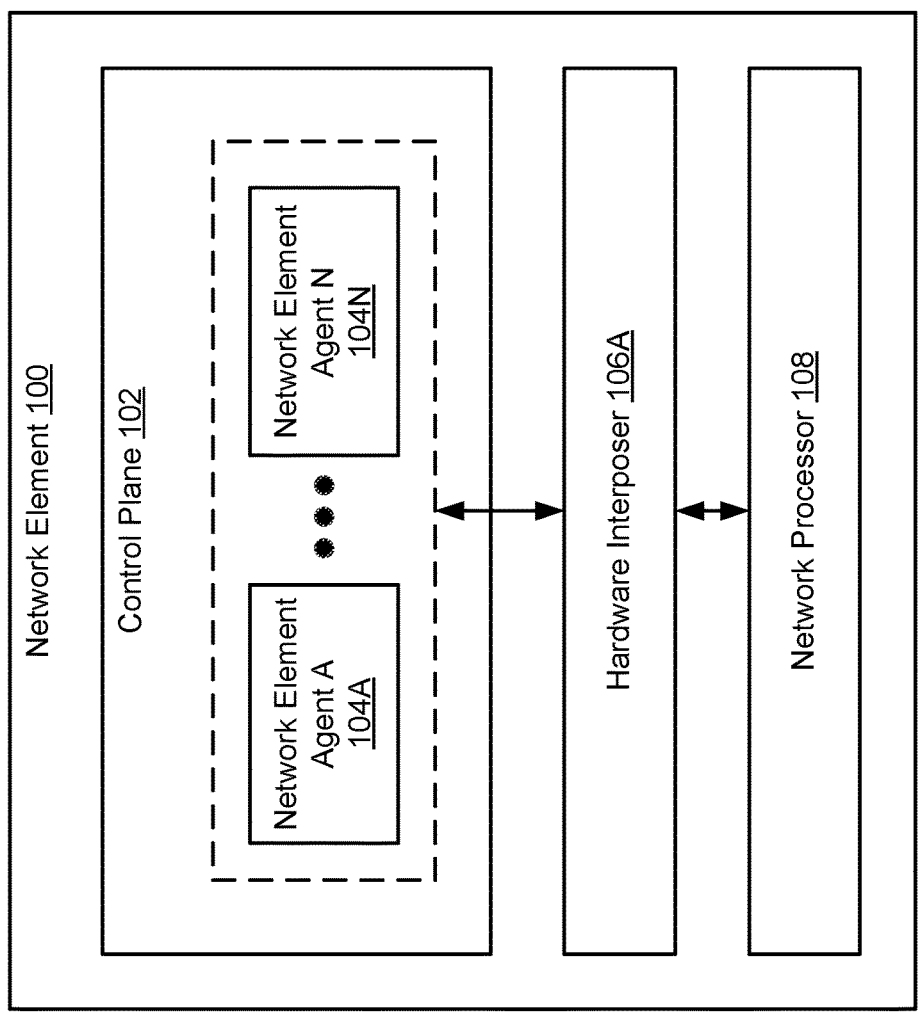
FIG. 1A shows a network element configuration in accordance with one or more embodiments of the invention.

FIG. 1A shows a network element configuration in accordance with one or more embodiments of the invention. The network element configuration involves a network element (100) that includes a control plane (102) containing one or more network element agent(s) (104A, 104N) operatively connected to a hardware interposer (106A), which in turn, is operatively connected to a network processor (108). Each of these components is described below.

In one embodiment of the invention, the network element (100) may be a switch, a router, a multilayer switch, and/or any other network communications device. The network element may be configured to transmit packets (e.g., via routing and/or forwarding) through a network. For example, the network element may be configured to receive incoming packets and forward the packets to another element to facilitate the transmission of the incoming packets to a destination element.

In one embodiment of the invention, the network element (100) may be a physical device that includes non-transitory storage, memory (e.g., random access memory (RAM)), one or more processor(s) (including the network processor (108) (discussed below)), and two or more physical ports. Each port may or may not be connected to another element on a network, such as a server, a switch, a router, etc. Further, the non-transitory storage may include instructions, which, when executed by the one or more processor(s), enable the network element to perform functions described in accordance with one or more embodiments of the invention (see e.g., FIG. 3).

In one embodiment of the invention, the control plane (102) may be a portion of the architecture of a network element that includes functionality to manage the overall operation of the network element. To accomplish this, the control plane includes one or more network element agent(s) (104A, 104N) (or processes), which each implement one or more protocols, features, and/or services of the network element (100). Examples of network element agents include, but are not limited to, a command line interface (CLI) agent, a routing information base (RIB) agent, a forwarding information base (FIB) agent, and a simple network management protocol (SNMP) agent.

In one embodiment of the invention, the one or more network element agents (104A, 104N) includes functionality to generate and submit write requests (WRs) (see e.g., FIG. 2B) for processing by the hardware interposer (106A). In one embodiment of the invention, WRs prompt the manipulation (or editing) of agent relevant data stored in the network processor (108), thereby influencing the configuration and/or operation of the network element. The aforementioned data may take the form of a table row in its entirety (or a targeted subset of a table row (discussed below)), which make up a table (and/or a register) within network processor memory (see e.g., FIG. 2A).

In one embodiment of the invention, the hardware interposer (106A) may be operatively connected to the one or more network element agents (104A, 104N). The hardware interposer may be one or more integrated circuit(s) configured to interact with the network processor (108). The hardware interposer may be, for example, a discrete processor, a digital signal processor (DSP), an application specific integrated circuit (ASIC), a field programmable gate array (FPGA), a microcontroller, any other type of circuitry configured to interact with the network processor, or any combination thereof.

In one embodiment of the invention, the hardware interposer (106A) includes functionality to manipulate (or edit or apply changes to) data, stored in network processor memory, that may be relevant to the responsibilities of a network element agent. As mentioned above, data relevant to a network element agent may refer to data that impacts the configuration and/or operation of the network element based on the responsibilities of the network element agent. Further, said data may take the form of table rows (or a targeted subset of a table row) that materialize one or more memory table(s) (and/or register(s)) in network processor memory. In one embodiment of the invention, a targeted subset of a table row may refer to one or more bit location(s) (or data field(s) or table column(s)), which denote the various datum (or elements) of the table row. By way of an example, the table row may be represented as a binary string (e.g., a sequence of bits or binary digits) of any arbitrary bit-length (e.g., the number of binary digits forming the sequence). In such an example, an element of the table row may be a single binary digit or, alternatively, encompass a smaller arbitrary number (or grouping of) binary digits. A targeted subset of the table row, in this context, may include one or more element(s), which may or may not be contiguous within the table row.

In one embodiment of the invention, the hardware interposer (106A) may include functionality to: (i) receive write requests (WRs) from a network element agent; and subsequently, (ii) process the received WRs. In processing the WRs, the hardware interposer may perform embodiments of the invention in accordance with the method described in FIG. 3.

In one embodiment of the invention, the network processor (108) may be operatively connected to the hardware interposer (106A). The network processor may be one or more integrated circuit(s) configured to send and/or receive packets to and/or from a network. Further, the network processor may be, for example, a discrete processor, a digital signal processor (DSP), an application specific integrated circuit (ASIC), a switch ASIC, a field programmable gate array (FPGA), a microcontroller, any other type of circuitry configured to send and receive packets, or any combination thereof. Additionally, the network processor may include one or more memory table(s) (and/or register(s)) for storing data, which may be at least relevant to the responsibilities of the one or more network element agent(s) (104A, 104N). Subsequently, such data may mandate the configuration and/or operation of the network element (100). In one embodiment of the invention, the one or more memory table(s) (and/or register(s)) may be stored in network processor (associated) memory, which is described in further detail in the discussion below with respect to FIG. 2A.

Figure 1B:
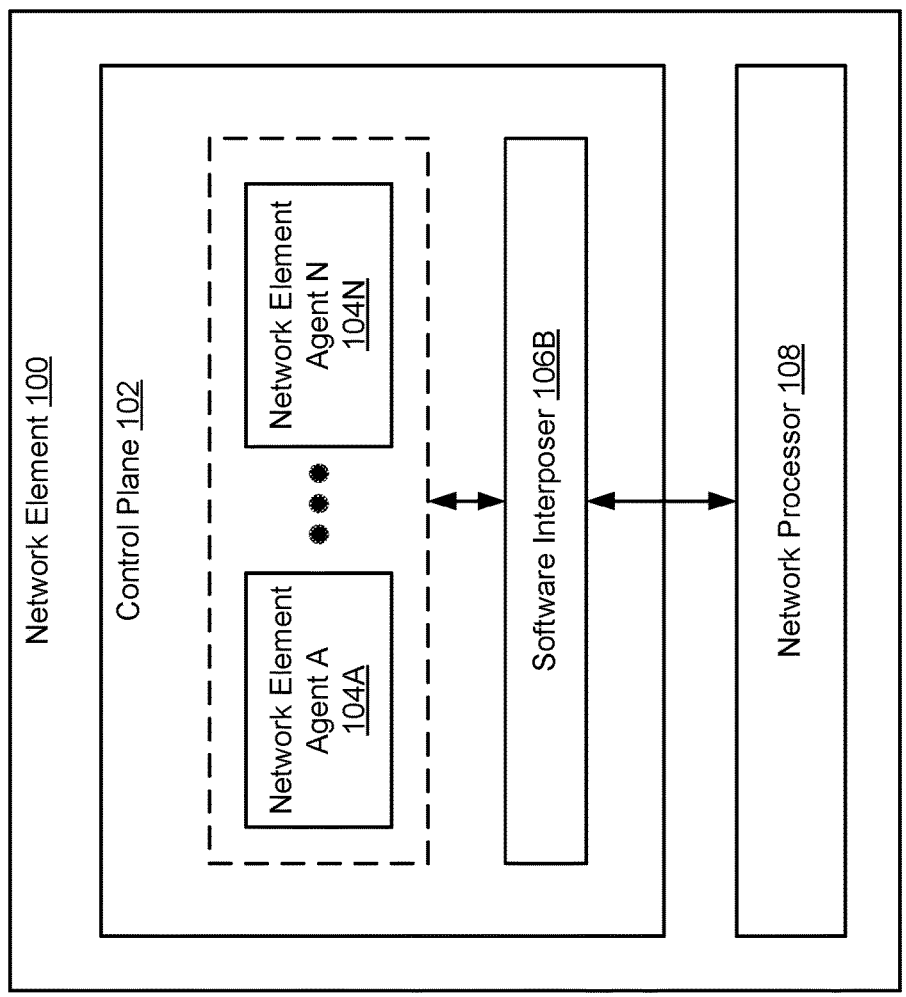
FIG. 1B shows an alternative network element configuration in accordance with one or more embodiments of the invention.

FIG. 1B shows an alternative network element configuration in accordance with one or more embodiments of the invention. The alternative network element configuration substantially resembles the network element configuration shown in FIG. 1A, except that the alternative network element configuration involves a network element (100) that includes a software (rather than a hardware) interposer (106B).

In one embodiment of the invention, the software interposer (106B) may be viewed as a program (or process) executing on the network element (100). More specifically, the software interposer may operate on the control plane (102) of the network element, as do the one or more network element agent(s) (104A, 104B). Further, similar to the hardware interposer (106A), the software interposer (106B) may be operatively connected to the one or more network element agent(s) and the network processor (108). In one embodiment of the invention, the software interposer may perform substantially similar to the hardware interposer with respect to its various functionalities as discussed above.

Those skilled in the art will appreciate that the invention is not limited to the architecture shown in FIGS. 1A and 1B.

Figure 2A:
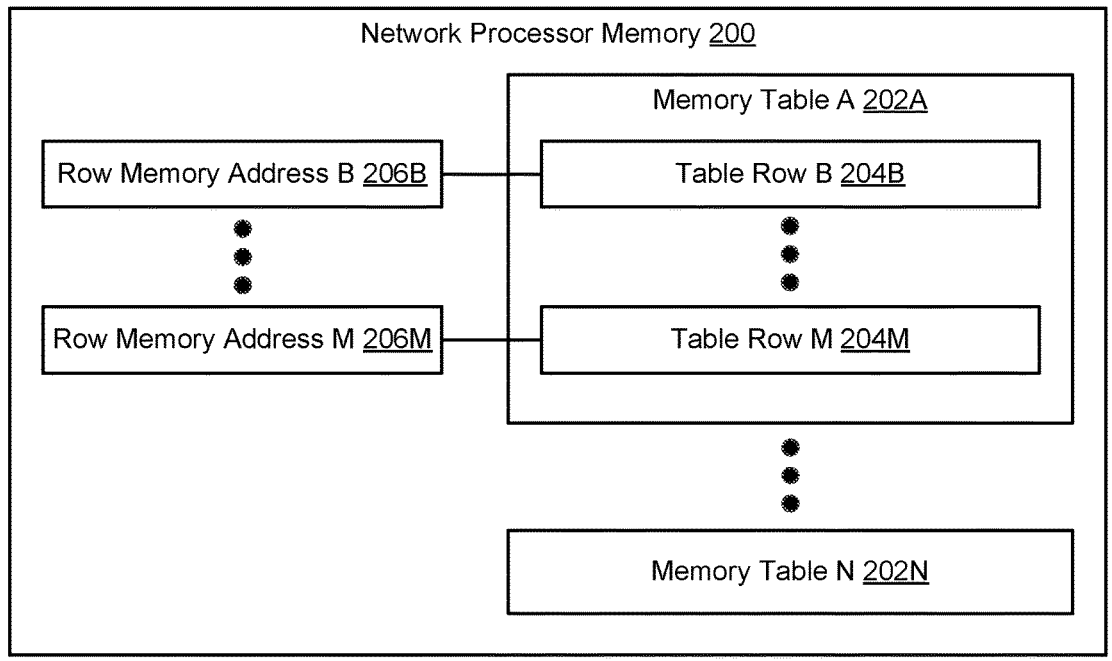
FIG. 2A shows network processor memory in accordance with one or more embodiments of the invention.

FIG. 2A shows network processor memory in accordance with one or more embodiments of the invention. The network processor memory (200) may refer to memory (e.g., random access memory (RAM), cache memory, flash memory, etc.) included in, and/or otherwise associated with, the network processor. In one embodiment of the invention, the network processor memory includes one or more memory tables (202A, 202N) and/or registers (not shown). Each memory table may store data associated with the configuration and/or operation of the network element in which the network processor resides. For example, one memory table may store data pertaining to the multi-chassis link aggregation (MLAG) configuration of the network element, whereas another may store data pertaining to neighbors information. The network processor memory may include additional information, such as computer readable program code (or instructions), without departing from the scope of the invention.

In one embodiment of the invention, a memory table (e.g., 202A) includes one or more table row(s) (204B, 204M). One of ordinary skill would appreciate that computer memory (e.g., network processor memory (200)) may be segmented into memory blocks, which are indexed via assigned memory addresses (e.g., row memory addresses (206B, 206M)). For example, within a 32-bit computer, memory may be arranged in blocks of 32 bits of data, which are assigned a memory address to facilitate in the reading and/or writing of data in the memory. Therefore, in one embodiment of the invention, a table row may correspond to a block of memory space that may be identified and/or located through a respective row memory address.

Figure 2B:
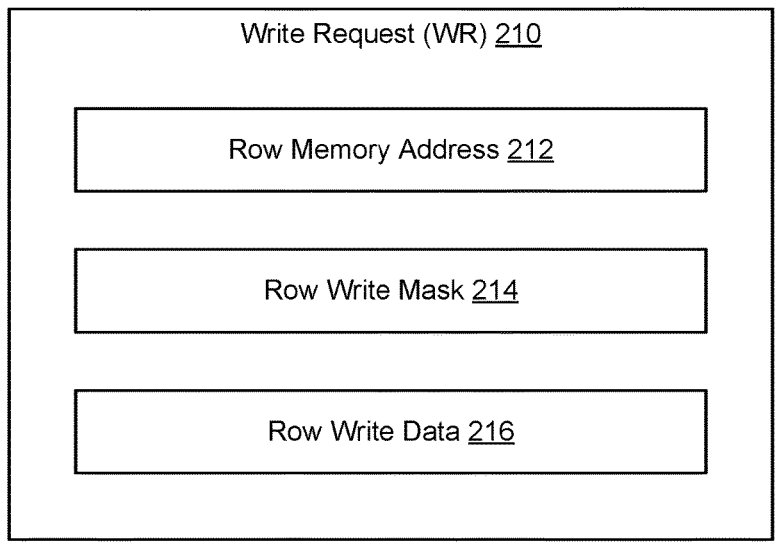
FIG. 2B shows a write request in accordance with one or more embodiments of the invention.

FIG. 2B shows a table write request in accordance with one or more embodiments of the invention. The write request (WR) (210) includes a row memory address (212), a row write mask (214), and row write data (216). Each of these components is described below.

In one embodiment of the invention, the write request (WR) (210) may be representative of a network element agent's submission to apply changes to a targeted subset of a table row (corresponding to a memory table associated with the network processor). As mentioned above, a subset of a table row may refer to data corresponding to one or more table columns, data fields, or bit locations (not shown) of the table row that may be relevant to a network element agent. Further, the changes may impact the configuration and/or operation of the network element as mandated by the one or more protocols, processes, and/or services being implemented by the requesting network element agent.

In one embodiment of the invention, changes to be applied to a table row may require access to the appropriate table row, which may be found via a an assigned row memory address (212). One of ordinary skill would appreciate that within associated memory, information (e.g., data, instructions, etc.) may be stored (or arranged) and tracked using memory addresses. The row memory address may be a unique identifier for pinpointing the location of data defining a particular table row (tied to particular configuration and/or operational settings) in the network processor memory.

In one embodiment of the invention, the row write mask (214), included in the WR (210), may facilitate the manipulation of a targeted subset of the table row associated with the specified row memory address (212). The row write mask (214) may be, for example, a bit string (e.g., a sequence of bits or binary digits), which may be used to specify the one or more bit locations (or data fields or table columns) of the table row to which changes are to be applied. Further, in one embodiment of the invention, the bit-length (e.g., the number of binary digits forming the sequence) of the aforementioned bit string may equal the bit-length of the data representing the table row. Moreover, when applying the row write mask to a specified table row, a bit location overlaid with a binary one (on the row write mask) may denote that new data (e.g., row write data (216) (discussed below)) is to be written in place of the existing data. Alternatively, a bit location overlaid with a binary zero (on the row write mask) may denote that the existing data is to remain unchanged. Said another way, bit location(s) overlaid with a binary one (e.g., "1") along the row write mask may refer to the bit location(s) (or data fields or table columns) of the table row that are relevant to, and are subject to change due the submitted WR (210) from, the requesting network element agent.

In one embodiment of the invention, the WR (210) further includes row write data (216) representative of changes to be applied to the specified table row. Similar to the row write mask (214), the row write data (216) may be, for example, a bit string with a bit-length equal to the bit-length of the data representing the specified table row. The row write data, however, may include the new data values to be written into the table row at the one or more bit location(s) (or data fields or table columns) specified by the row write mask (discussed above). In other words, whereas, in one embodiment of the invention, the row write mask (214) identifies which bit location(s) of the specified table row may be subject to manipulation (or editing), the row write data (216) provides the new data value(s) that is to replace the existing table row data positioned at the aforementioned identified bit location (s).

Figure 3:
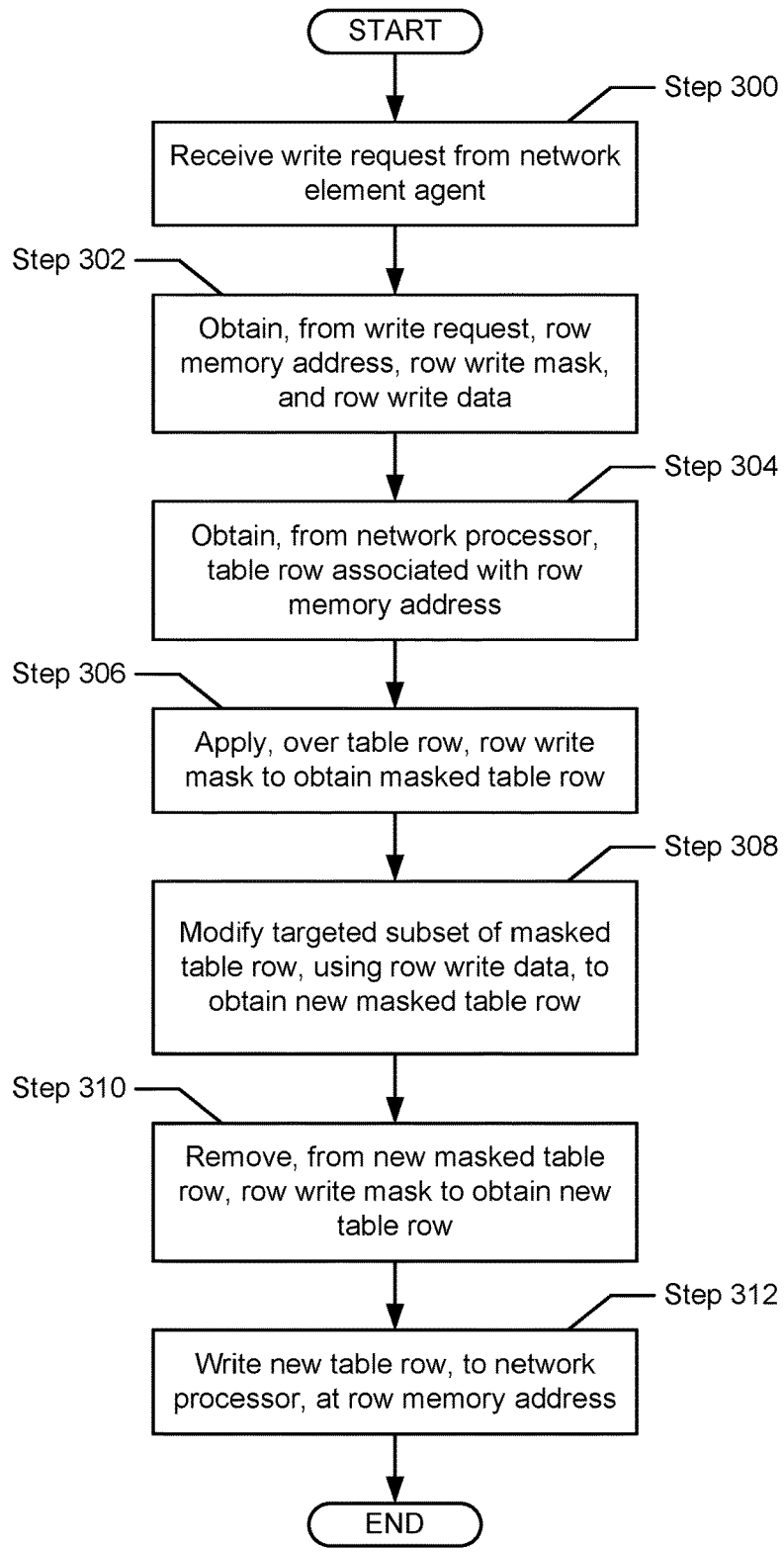
FIG. 3 shows a flowchart describing a method for modifying assorted data on a network element in accordance with one or more embodiments of the invention.

FIG. 3 shows a flowchart describing a method for modifying assorted data on a network element in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

Turning to FIG. 3, in Step 300, a write request (WR) (see e.g., FIG. 2B) is received from a network element agent. In one embodiment of the invention, the network element agent may submit (or write) the WR into a data structure, monitored by the hardware (or software) interposer, and designated to queue said requests. In such an embodiment, the data structure may serve as a mechanism through which requests from multiple network element agents may be serialized into a single stream that could be received and/or managed by the hardware (or software) interposer. In one embodiment of the invention, the aforementioned data structure may be, for example, a circular or ring buffer (or array) instantiated in memory space associated with the network element. Subsequently, the hardware (or software) interposer may poll the data structure for newly written WRs, which are read and processed in accordance with embodiments of the invention. Additional and/or alternative mechanisms through which WRs are handled may be performed without departing from the scope of the invention.

As discussed above, in one embodiment of the invention, a WR may include a row memory address, a row write mask, and row write data (see e.g., FIG. 2B). In Step 302, the row memory address, row write mask, and row write data are obtained (or extracted) from the WR received in Step 300.

In Step 304, a table row, associated with the aforementioned row memory address, is obtained (or read) from the network processor. In one embodiment of the invention, table rows (or arrays) may be stored, and subsequently indexed using memory addresses, in the network processor memory. Further, the row memory address may serve as a unique identifier that may facilitate the locating and retrieval of data defining the table row (or array). In one embodiment of the invention, said data may be assorted to infer that different data, relevant to different network element agents, may co-occupy the table row. In such an embodiment, the different data may be represented as non-overlapping subsets of the assorted data. Moreover, each non-overlapping subset may include one or more non-contiguous elements. Elements within a table row may be segregated as, for example, bit locations, data fields, table columns, or any other similar terminology portraying the division of data within the table row.

In Step 306, the row write mask is applied over the table row, resulting in a masked table row. In one embodiment of the invention, the overlaying of the row write mask onto the table row may specify (or identify) a targeted subset of the assorted data, which is relevant to the requesting network element agent. The targeted subset would encompass the portion of data (e.g., the one or more element(s) of the table row (or array)) that are to be changed based on the WR (received in Step 300). Additionally, in one embodiment of the invention, the row write mask may block the imprinting of changes on the remainder of the table row, which is irrelevant to the requesting network element agent. As a result, other data co-occupying the table row, which is pertinent to the responsibilities of other network element agents, remains intact (or unchanged). In one embodiment of the invention, the masked table row may be viewed as a filtered version of the table row, wherein only a set of one or more element(s) (e.g., the targeted subset) of the table row may be exposed to which new data may be applied. In one embodiment of the invention, the applying of the row write mask over the table row may resemble Boolean/bitwise operations, where the operators used include, for example, the Boolean/bitwise AND, OR, XOR, and/or any combination thereof.

In Step 308, the targeted subset of the assorted data (mentioned in Step 306) is modified using the row write data, thereby obtaining a new masked table row. In one embodiment of the invention, the new masked table row may refer to the masked table row with incorporation of new data (provided by the row write data) that corresponds to the targeted subset of the table row. In other words, the existing data associated with the one or more element(s), specified by the row write mask, may be replaced with new data values in the row write data that correspond to those one or more element(s).

In Step 310, the row write mask is removed from the new masked table row in order to obtain a new table row. In one embodiment of the invention, the aforementioned new mask table row may essentially be the masked table row with new data value(s) at one or more element(s) representative of the targeted subset. Further, upon removal of the row write mask, the table row (obtained in Step 304) is exposed; however, because the new masked table row incorporates new data (from the row write data), the exposed table row also incorporates new data, and may therefore be referred as the new table row.

In Step 312, the new table row (obtained in Step 310) is written to the network processor. More specifically, in one embodiment of the invention, the changed data that includes the new table row may replace the existing data that includes the table row at the specified row memory address. In accomplishing this, the data in the table row, which may be relevant to the requesting network element agent, is altered without impacting other data that exists in the table row.

Figure 4A:
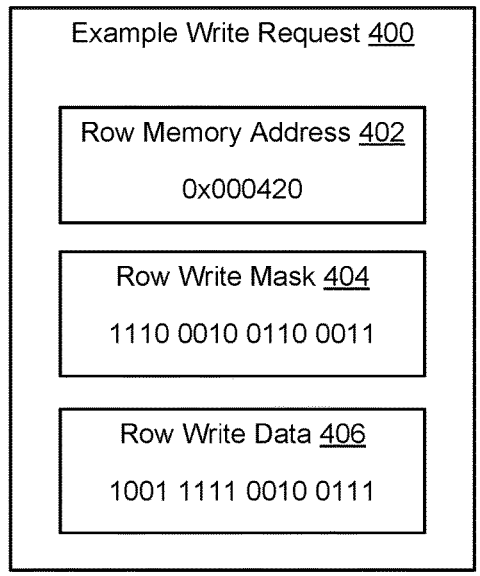
FIG. 4A shows an example write request in accordance with one or more embodiments of the invention.
Figure 4B:
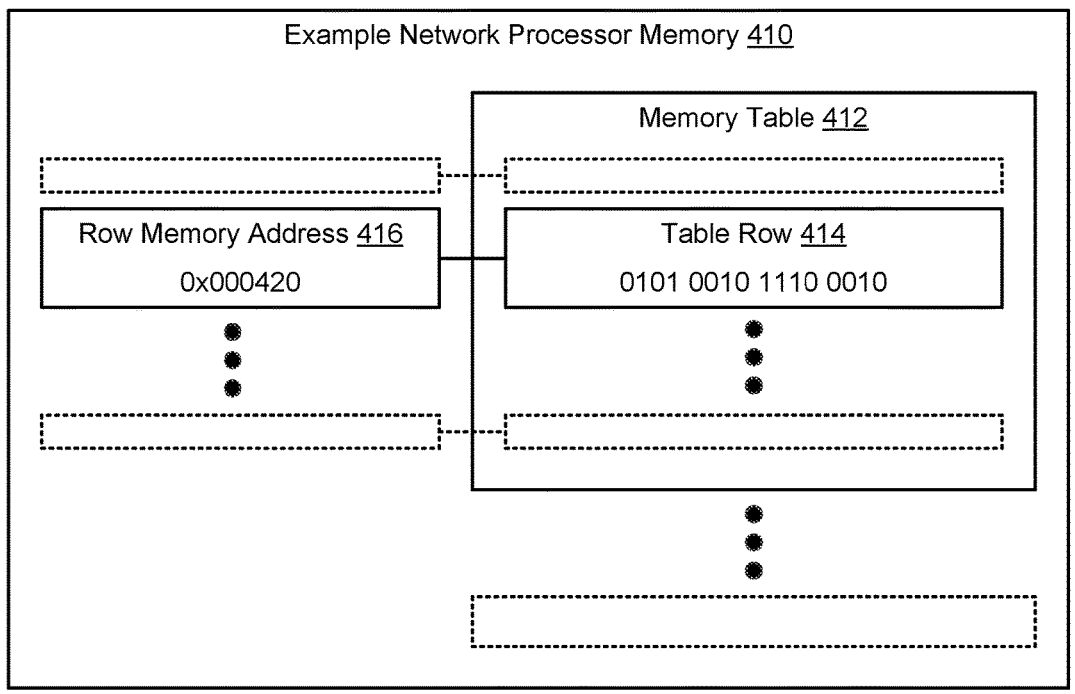
FIG. 4B shows example network processor memory in accordance with one or more embodiments of the invention.
Figure 4C:
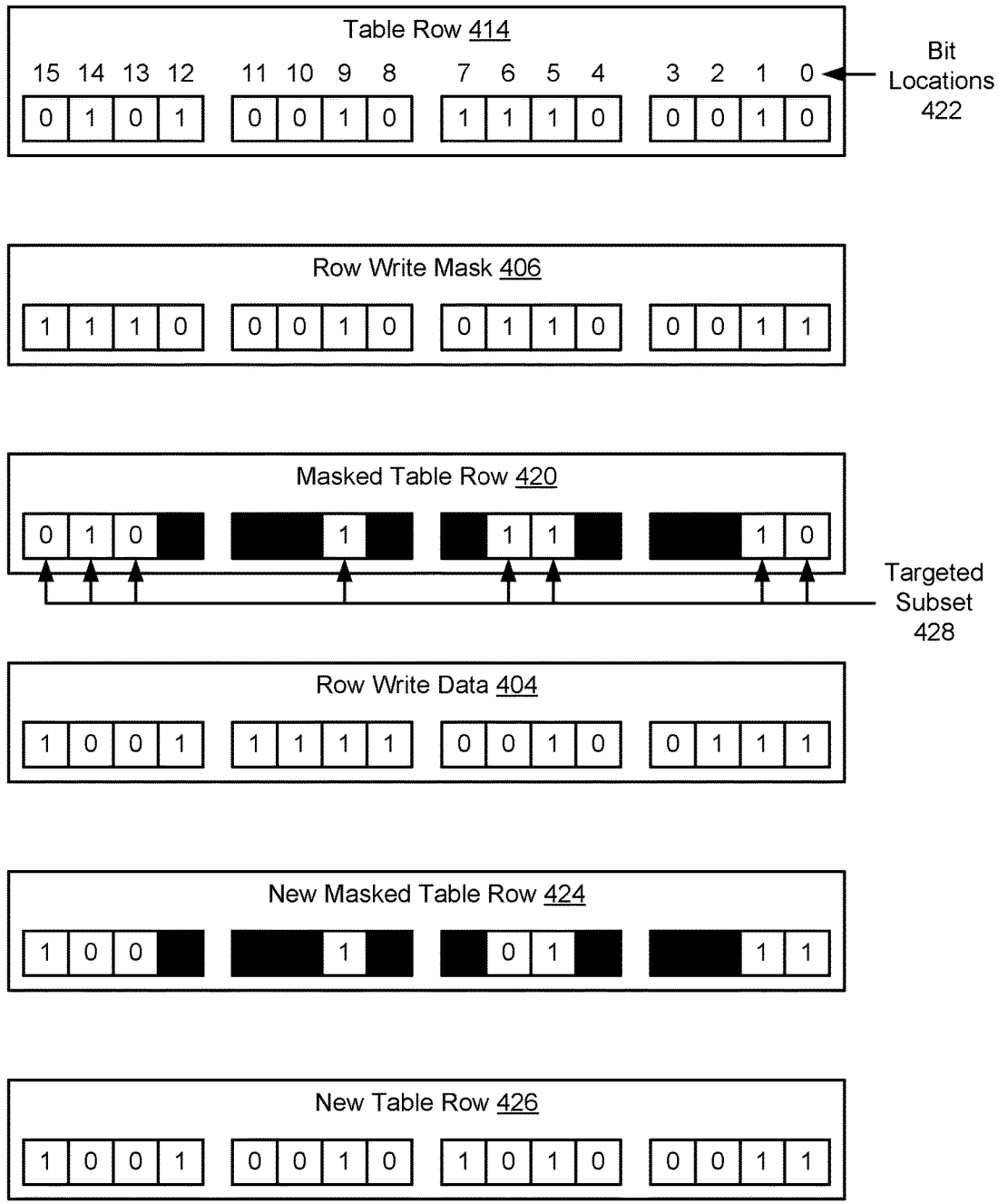
FIG. 4C shows an example editing progression of a table row in accordance with one or more embodiments of the invention.

FIGS. 4A-4C describe an example in accordance with one or more embodiments of the invention. The following example is for explanatory purposes only and not intended to limit the scope of the invention.

Turning to the example, consider a scenario whereupon the command line interface (CLI) network element agent, per instructions from a network administrator (managing the network element in which the agent resides), requests that relevant parameters, which at least in part, dictate the active configuration and/or operation of the network element, be changed in order to enact said instructions. Further, it is determined that certain data, relevant to the instructions, co-occupy a memory table (and/or register), in network processor memory, with other data that is associated with the responsibilities of other network element agents. Recognizing that the network processor only allows for a whole table row, instead of a subset of a table row, to be manipulated (or edited) at any given time, and without knowing, nor wanting to affect, data tied to other agents, the CLI network element agent tasks the hardware (or software) interposer to apply changes to the memory table (and/or register) as appropriate.

FIG. 4A shows an example table write request in accordance with one or more embodiments of the invention. Following the above mentioned scenario, in tasking the hardware (or software) interposer, the CLI network element agent submits (or writes) a write request (WR) (as shown in FIG. 4A) into a designated data structure (e.g., circular buffer), which the hardware (or software) interposer is known to poll, read items (e.g., WRs) from, and subsequently process said items. The submitted WR (400), shown in FIG. 2A, includes a row memory address, a row write mask, and row write data. The specified row memory address (402)—0x000420—refers to the location in network processor memory where the table row (containing relevant data to which changes need be applied) is stored. The specified row write mask (404)—1110 0010 0110 0011—identifies which bit locations (or data fields or table columns or elements) of the table row corresponds to data, which when edited, imprints the instructions the CLI network element agent wishes to perform without affecting settings implemented by other agents. Lastly, the specified row write data (406)—1001 1111 0010 0111—provides new data values, at the appropriate bit locations identified by the row write mask, to which existing data at those locations in the table row are to be replaced with.

FIG. 4B shows example network processor memory in accordance with one or more embodiments of the invention. Upon polling the aforementioned circular buffer, the hardware (or software) interposer determines a new WR is queued, and subsequently, fetches and processes the new WR. More specifically, the hardware (or software) interposer obtains (or extracts) the row memory address, row write mask, and row write data specified in the fetched WR. Using this information, the hardware (or software) interposer locates the table row (414) corresponding to the specified row memory address (416), and proceeds to attain a copy of the existing data within the table row—0101 0010 1110 0010.

FIG. 4C shows an example editing progression of a table row in accordance with one or more embodiments of the invention. Having attained the existing data defining the specified table row (414), the hardware (or software) interposer, next, applies the specified row write mask (406) to obtain a masked table row (420). Within the row write mask, bit locations (422) overlaid with a binary one (e.g., bit locations 15, 14, 13, 9, 6, 5, 1, and 0) identify the data, representing the relevant subset of the table row, wherein changes are to be applied. Conversely, bit locations overlaid with a binary zero (e.g., bit locations 12, 11, 10, 8, 7, 4, 3, and 2) identify the data which is to remain unchanged. Subsequently, the hardware (or software) interposer replaces the existing data, in the aforementioned former bit locations, with new data values, corresponding to those bit locations, provided in the specified row write data (404). The result is the masked table row, incorporating the applied changes (424), which present the targeted subset (e.g., bit locations 15, 14, 13, 9, 6, 5, 1, and 0) of the masked table row (420) taking on the bit values of the row write data (404) at those bit locations—1001 1111 0010 0111. Afterwards, the hardware (or software) interposer removes the row write mask to obtain a new table row (426)—1001 0010 1010 0011, which includes the new data values associated with the specified row write data (404) at the targeted subset of the table row, while maintaining the existing data at bit locations irrelevant to the instructions pertinent to the CLI network element agent. Finally, the hardware (or software) interposer writes the obtained new table row (426), essentially effecting the WR (400) submitted by the CLI network element agent, back into the network processor memory (410) at the specified row memory address (416). Accordingly, the new and existing data combination representing the new table row (426) replaces the all existing (e.g., old) data that had previously encompassed the table row (414).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a network element, comprising:
   receiving, from a first network element agent, a write request comprising a row memory address, a row write mask, and a row write data;
   obtaining, from a network processor, a row associated with the row memory address, wherein the row comprises data;
   applying, over the row, the row write mask to obtain a masked row, wherein the row write mask denotes at least one location of unchanged data in the row and at least one location to which changes are to be applied in the row;
   modifying, using the row write data, a first targeted subset of the data to obtain a new masked row;
   removing, from the new masked row, the row write mask to obtain a new row; and
   writing, to the network processor, the new row;
   wherein the data comprises the first targeted subset and a second targeted subset,
   wherein the first targeted subset and the second targeted subset are non-overlapping, and
   wherein the first targeted subset is relevant to the first network element agent and the second targeted subset is relevant to a second network element agent.

2. The method of claim 1, wherein the second targeted subset is specified in a second write request.

3. The method of claim 1, wherein the first network element agent and the second network element agent are different processes executing on the network element.

4. The method of claim 1, wherein the network element is one selected from a group consisting of a switch, a router, and a multilayer switch.

5. The method of claim 1, wherein the network processor is one selected from a group consisting of a discrete processor, a digital signal processor (DSP), an application specific integrated circuit (ASIC), a switch ASIC, a field programmable gate array (FPGA), and a microcontroller.

6. The method of claim 1, wherein the row memory address is an identifier for locating the row in a network processor memory associated with the network processor.

7. The method of claim 1, wherein the row write mask specifies the first targeted subset of the data.

8. A network element, comprising:
   a control plane comprising a network element agent;
   a hardware interposer operatively connected to the network element agent; and
   a network processor operatively connected to the hardware interposer,
   wherein the hardware interposer is configured to:
      receive, from the network element agent, a write request comprising a row memory address, a row write mask, and a row write data;
      obtain, from the network processor, a row associated with the row memory address, wherein the row comprises data;
      apply, over the row, the row write mask to obtain a masked row, wherein the row write mask denotes at least one location of unchanged data in the row and at least one location to which changes are to be applied in the row;
      modify, using the row write data, a first targeted subset of the data to obtain a new masked row;
      remove, from the new masked row, the row write mask to obtain a new row; and
      write, to the network processor, the new row;
      wherein the data comprises the first targeted subset and a second targeted subset,
      wherein the first targeted subset and the second targeted subset are non-overlapping, and
      wherein the first targeted subset is relevant to the first network element agent and the second targeted subset is relevant to a second network element agent.

9. The network element of claim 8, wherein the second targeted subset is specified in a second write request.

10. The network element of claim 8, wherein the hardware interposer is one selected from a group consisting of a discrete processor, a digital signal processor (DSP), an application specific integrated circuit (ASIC), a field programmable gate array (FPGA), and a microcontroller.

11. A network element, comprising:
   a control plane comprising a network element agent and a software interposer, wherein the network element agent and the software interposer are operatively connected; and a network processor operatively connected to the software interposer, wherein the software interposer is configured to:
- receive, from the network element agent, a write request comprising a row memory address, a row write mask, and a row write data;
- obtain, from the network processor, a row associated with the row memory address, wherein the row comprises data;
- apply, over the row, the row write mask to obtain a masked row, wherein the row write mask denotes at least one location of unchanged data in the row and at least one location to which changes are to be applied in the row;
- modify, using the row write data, a first targeted subset of the data to obtain a new masked row;
- remove, from the new masked row, the row write mask to obtain a new row; and
- write, to the network processor, the new row wherein the data comprises the first targeted subset and a second targeted subset, wherein the first targeted subset and the second targeted subset are non-overlapping, and wherein the first targeted subset is relevant to the first network element agent and the second targeted subset is relevant to a second network element agent.

12. The network element of claim 11, wherein the second targeted subset is specified in a second write request.

13. The network element of claim 11, wherein the software interposer is a process executing on the network element.

* * * * *